United States Patent
Capellman

(10) Patent No.: US 11,914,977 B2
(45) Date of Patent: Feb. 27, 2024

(54) TRANSLATING TEXT ENCODINGS OF MACHINE LEARNING MODELS TO EXECUTABLE CODE

(71) Applicant: SPARKCOGNITION, INC., Austin, TX (US)

(72) Inventor: Jarred Capellman, Cedar Park, TX (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

(21) Appl. No.: 17/562,097

(22) Filed: Dec. 27, 2021

(65) Prior Publication Data

US 2022/0121431 A1   Apr. 21, 2022

Related U.S. Application Data

(63) Continuation of application No. 16/941,927, filed on Jul. 29, 2020, now Pat. No. 11,210,073.

(51) Int. Cl.
*G06F 8/41* (2018.01)
*G06N 20/00* (2019.01)
*G06F 18/24* (2023.01)
*G06V 10/94* (2022.01)

(52) U.S. Cl.
CPC ............ *G06F 8/427* (2013.01); *G06F 8/4435* (2013.01); *G06F 18/24* (2023.01); *G06N 20/00* (2019.01); *G06V 10/945* (2022.01)

(58) Field of Classification Search
CPC ........................................................ G06F 8/41
See application file for complete search history.

(56) References Cited

U.S. PATENT DOCUMENTS

| | | | | |
|---|---|---|---|---|
| 7,434,213 | B1 * | 10/2008 | Prakash | G06F 8/41 |
| | | | | 717/152 |
| 8,660,018 | B2 * | 2/2014 | Sharma | H04L 41/12 |
| | | | | 370/254 |
| 11,410,646 | B1 * | 8/2022 | Erbas | G10L 15/1822 |
| 2013/0275721 | A1 | 10/2013 | Lin et al. | |
| 2018/0285772 | A1 * | 10/2018 | Gopalan | G06N 7/01 |
| 2019/0138722 | A1 * | 5/2019 | Krcál | H04W 12/12 |
| 2020/0097545 | A1 | 3/2020 | Chatterjee et al. | |
| 2020/0219013 | A1 | 7/2020 | Wellman et al. | |
| 2020/0326934 | A1 * | 10/2020 | Tepper | G06F 8/75 |
| 2020/0371778 | A1 * | 11/2020 | Ni | G06N 3/084 |

* cited by examiner

*Primary Examiner* — Jae U Jeon

(57) ABSTRACT

Translating text encodings of machine learning models to executable code, the method comprising: receiving a text encoding of a machine learning model; generating, based on the text encoding of the machine learning model, compilable code encoding the machine learning model; and generating, based on the compilable code, executable code encoding the machine learning model.

20 Claims, 9 Drawing Sheets

```
booster[0]:
0:[f525<3.32943e+07] yes=1,no=2,missing=2
1723:leaf=0.05
1724:[f887<0.5] yes=2191,no=2192,missing=2191
2191:[f665<255732] yes=2677,no=2678,missing=2677
2677:leaf=-0.05
2678:leaf=0.0225806
2192:[f28<0.5] yes=2679,no=2680,missing=2679
2679:leaf=-0.0176471
2680:leaf=0.05
1280:[f156<2.5] yes=1725,no=1726,missing=1725
1725:leaf=0.05
1726:leaf=-0.05
914:[f82<0.5] yes=1281,no=1282,missing=1281
1281:leaf=0.0030303
1282:leaf=0.05
612:[f146<114] yes=915,no=916,missing=915
915:leaf=0.05
916:leaf=-0.05
398:[f367<0.5] yes=613,no=614,missing=613
613:[f528<42984] yes=917,no=918,missing=918
917:leaf=-0.0176471
918:[f16<1.5] yes=1283,no=1284,missing=1283
1283:leaf=0.05
1284:leaf=0.0030303
614:[f530<140] yes=919,no=920,missing=920
919:leaf=0.0314286
920:leaf=-0.05
```

FIG. 2A

```
public class Model {
public double RunModel(double[] modelVector) {
var confidence = 0.0;
if (modelVector[645] < 1.98679){confidence += 0.05; }
if (modelVector[665] < 255732){confidence += 0.0176471; }
if (modelVector[28] < 0.5){confidence += 0.05; }
if (modelVector[156] < 2.5){confidence += 0.0030303; }
...
 return confidence;
}
}
}
```

FIG. 2B

```
public static void GenerateAssembly(string sourceFile, string outputFile)
{
   var startTime = DateTime.Now;

var options = CSharpParseOptions.Default.WithLanguageVersion(LanguageVersion.CSharp8);

var parsedSyntaxTree = SyntaxFactory.ParseSyntaxTree(File.ReadAllText(sourceFile), options);

var references =
      DependencyContext.Default.CompileLibraries
         .SelectMany(cl => cl.ResolveReferencePaths())
         .Select(asm => MetadataReference.CreateFromFile(asm))
         .ToList();

Console.WriteLine($"{references.Count} assemblies found...");

var result = CSharpCompilation.Create("Model",
      new[] {parsedSyntaxTree},
      references: references,
      options: new CSharpCompilationOptions(OutputKind.DynamicallyLinkedLibrary,
         optimizationLevel: OptimizationLevel.Release,
         assemblyIdentityComparer: DesktopAssemblyIdentityComparer.Default)).Emit(outputFile);

if (result.Success)
   {
      Console.WriteLine($"Generated C# DLL successfully in {DateTime.Now.Subtract(startTime).TotalSeconds} seconds");
   }
   else
   {
      Console.WriteLine("Failed to Generated C# DLL...");

var failures = result.Diagnostics.Where(diagnostic => diagnostic.IsWarningAsError || diagnostic.Severity == DiagnosticSeverity.Error);

foreach (var diagnostic in failures)
      {
         Console.Error.WriteLine("{0}: {1}", diagnostic.Id, diagnostic.GetMessage());
      }
   }
}
```

FIG. 2C

TRANSLATING TEXT ENCODINGS OF MACHINE LEARNING MODELS TO EXECUTABLE CODE

CROSS-REFERENCE TO RELATED APPLICATION

This is a continuation application for patent entitled to a filing date and claiming the benefit of earlier-filed U.S. Pat. No. 11,210,073, issued Dec. 28, 2021, herein incorporated by reference in its entirety.

BACKGROUND

Software may be used to train various machine learning models using training data. Some machine learning software such as XGBoost may output a trained machine learning model into multiple formats, including binary files and text files. A model encoded as a binary file may be platform independent and used by other software or a software wrapper compiled to a particular platform. As the binary file of the model is platform independent, the model itself is not compiled or optimized to a particular platform.

BRIEF DESCRIPTION OF THE DRAWINGS

FIG. 2A is a portion of an example text encoding of a machine learning model.

FIG. 2B is a portion of compliable code generated based on an example text encoding of a machine learning model.

FIG. 2C is a portion of code for generating executable code based on compilable code generated from an example text encoding of a machine learning model.

DETAILED DESCRIPTION

Figure 1:
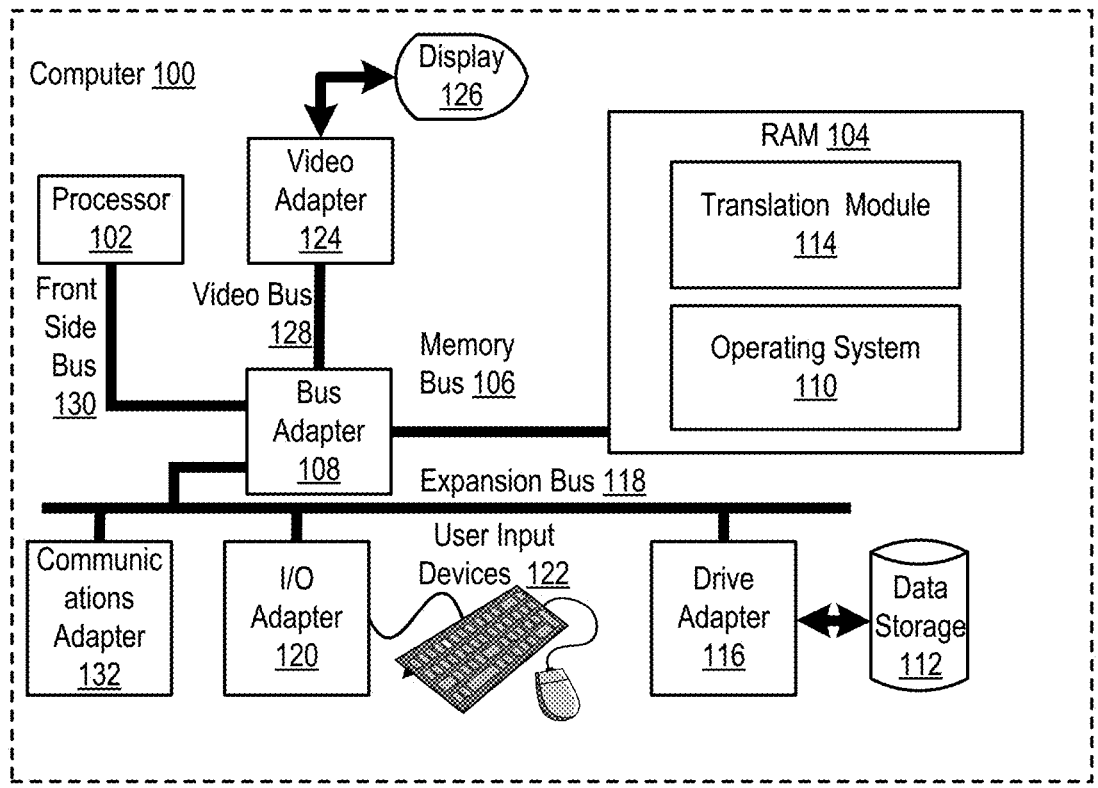
FIG. 1 is a block diagram of an example computer for translating text encodings of machine learning models to executable code according to some embodiments.

Software may be used to train various machine learning models using training data. Some machine learning software such as XGBoost may output a trained machine learning model into multiple formats, including binary files and text files. A model encoded as a binary file may be used by other software or a software wrapper compiled to a particular platform (e.g., a particular operating system, a particular hardware configuration, and the like). Though the binary file of the model may be used on various platforms using software or wrappers compiled to the particular platform, the model itself is platform independent and is not compiled or optimized to the particular platform. Thus, the limited computational resources found in older or legacy platforms may not be sufficient to use the binary file of the model, or may experience poor performance.

A text encoding describes the functions, steps, algorithms, and the like used by the model to perform its trained operation (e.g., classification, decision making, etc.) using human readable text. In the context of this disclosure, the text encoding of a model does not include compliable or executable code encodings of the model, but may include pseudocode, markup languages, and the like.

As an example, assume that a classifier model is trained to identify, based on input data, whether or not a particular process or portion of data includes malware. In other words, the classifier model is trained to make a binary classification as to whether or not the input data includes malware. It is understood that this classifier model merely serves as an example, and that any other model may be used. The text encoding of the classifier model may be encoded using multiple conditional statements such as IF statements. In this context, the conditional statement includes a clause that may be evaluated as either TRUE or FALSE. A first conditional action is performed when the clause is evaluated to TRUE and a second conditional action is performed when the clause is evaluated to FALSE. The conditional actions may include a modification to a confidence score (e.g., an increase or decrease to a confidence score). The conditional actions may also include a call to another conditional statement (e.g., a nested conditional statement). The final result of evaluating any called conditional statement is a confidence score used to make the binary classification (e.g., by comparing the confidence score to a threshold).

As set forth below, the text encoding of the model may be parsed to generate compilable code encoding the model. In other words, the text encoding of the model is translated or converted into an encoding of the model using a compilable programming language (e.g., C++, Java, C#, or any other programming language as can be appreciated). The compilable code may then be compiled into executable code (e.g., an executable application, an executable library). This allows the text encoding of the model to be used to generate executable code encodings of the model compiled for use on any platform, allowing for significant performance increases when compared to using a binary file encoding of the model and additional software or wrappers. Moreover, as the text encoding of the model can be reused for generating any executable code encoding of the model, an executable encoding of the model can be generated for a target platform without retraining or regenerating a binary encoding of the model.

FIG. 1 is a block diagram of an exemplary computer 100 configured for translating text encodings of machine learning models to executable code according to certain embodiments. The computer 100 of FIG. 1 includes at least one computer processor 102 or 'CPU' as well as random access memory 104 ('RAM') which is connected through a high speed memory bus 106 and bus adapter 108 to processor 102 and to other components of the computer 100.

Stored in RAM 104 is an operating system 110. Operating systems useful in computers configured for translating text encodings of machine learning models to executable code according to certain embodiments include UNIX™, Linux™, Microsoft Window™, and others as will occur to those of skill in the art. The operating system 110 in the example of FIG. 1 is shown in RAM 104, but many components of such software typically are stored in non-volatile memory also, such as, for example, on data storage 112, such as a disk drive. Also stored in RAM is the translation module 114 a module for translating text encodings of machine learning models to executable code according to certain embodiments.

The translation module 114 receives a text encoding of a machine learning model. The text encoding of the machine learning model may be generated by XGBoost or other software used to train and generate machine learning models. For example, the text encoding of the machine learning model encodes a machine learning model trained using training data. It is understood that, in some embodiments, the text encoding of the machine learning model may encode an untrained machine learning model (e.g., a model that has not been provided training data, a model in an initial state, or a manually configured model). The text encoding of the machine learning model include a plurality of conditional statements (e.g., IF statements, CASE SWITCH statements, etc.). One or more of the conditional statements may include nested conditional statements evaluated in response to the evaluation of another conditional statement.

Receiving the text encoding of the machine learning model may include receiving the text encoding as input to the translation module 114. Receiving the text encoding of the machine learning model may also include accessing locally or remotely stored data for the text encoding of the machine learning model.

The translation module 114 then generates, based on the text encoding of the machine learning model, compilable code encoding the machine learning model. The translation module 114 may parse the text encoding of the machine learning model using regular expressions or other parsing techniques as can be appreciated. For example, where the text encoding of the machine learning model includes a plurality of conditional statements, the translation module 114 may parse the plurality of conditional statements. Parsing a conditional statement may include identifying an occurrence of a conditional statement in the text encoding of the machine learning model and identifying parameters or attributes of the conditional statement. For example, identifying the parameters or attributes of the conditional statement may include identifying one or more clauses to be evaluated when evaluating the conditional statement, identifying conditional actions performed depending on how the clause(s) are evaluated (e.g., TRUE or FALSE), and the like.

The translation module then generates the compilable code based on the parsed plurality of conditional statements. For example, in some embodiment, a conditional statement in the text encoding of the machine learning model may be converted to a conditional statement embodied as one or more lines of compilable code. In some embodiments, the one or more lines of compilable code are generated as a string.

For example, assume the text encoding of the machine learning model includes the following conditional statement:

```
IF input > X
   THEN confidence_score = confidence_score +1
   ELSE confidence_score = confidence_score - 1
ENDIF
```

In this example, a variable "input" is compared to a value X. If "input" is greater than X, a value "confidence score" is increased by 1. Otherwise, the value for "confidence score" is decreased by 1. The translation module 114 may then generate the following string of C# code corresponding to the parsed conditional statement:

```
"if (input > X)
{
   confidence_score++;
}
else
{
   confidence_score--;
}"
```

In this example, a portion of C# code is generated for the conditional statement as a string. The string may then be appended onto another string storing the compilable code that has been generated. For example, a base string is generated by the translation module 114. The base string may be an empty string, or an initialized string including a predefined value (e.g., text found at the beginning of a file of a compilable code defining classes, referencing libraries, beginning a method or function, etc.). Strings of compilable code are then appended to the base string as they are generated. After the text encoding of the machine learning model has been parsed and the string encoding of the compilable code has been generated, the string encoding may then be output to a file that may be compiled. In other embodiments, the compilable code for each parsed conditional statement may be stored in separate data structures or in separate entries in a data structure. For example the compilable code for each parsed conditional statement may each be stored as separate Dictionaries, Vectors, Lists, and the like, or as separate entries in a Dictionary, Vector, List, and the like. To generate the compilable code, the data structure(s) are iterated through and their stored strings of compilable code are output to a file that may be compiled. In a further embodiment, various parameters of the conditional statement (e.g., the clause, the conditional actions) are each encoded as strings or otherwise stored in a data structure, and then included in a lines of compilable code when outputting the compilable file. One skilled in the art would appreciate that a variety of approaches may be used to generate portions of compilable code from parsed conditional statements of the text encoding of the machine learning model, and that approaches other than those described herein may be used.

In some embodiments, generating the compilable code based on the parsed plurality of conditional statements includes generating, in the compilable code, another conditional statement combining two or more of the plurality of conditional statements. For example, some programming languages or compilers may have a limit as to how deeply nested a conditional statement may be (e.g., how many conditional statements are evaluated to evaluate the nested conditional statement). The text encoding of the machine learning model may include nested conditional statements at a greater depth than the limit of the compiler or programming language. Accordingly, a nested conditional statement may be combined with another conditional statement into a single conditional statement.

For example, assume the text encoding of the machine learning model includes the following conditional statement:

```
IF A == TRUE
   THEN IF B == TRUE
      THEN confidence_score = confidence_score + 1
      ELSE
   ELSE
ENDIF
```

Here, the "IF B==TRUE" conditional statement is nested within the "IF A==TRUE" conditional statement, only being evaluated if A is TRUE. The corresponding C# code for this conditional statement may be generated as:

```
"if (A)
{
    if (B)
    {
        confidence_score++;
    }
}"
```

Functionally equivalent C# code combining conditional statements may instead be generated as:

```
"if (A && B)
{
    confidence_score++;
},"
```

Thus, the nested conditional statement "IF B==TRUE" is combined with the conditional statement "IF A==TRUE" to reduce the depth of the nested conditional statement. One skilled in the art would appreciate that this is merely an example, and that more deeply nested conditional statements may also be combined. Moreover, one skilled in the art would appreciate that how various nested conditional statements are combined would depend on the particular chain of conditional statements to be combined.

In some embodiments, to reduce the depth of nested conditional statements in the compilable code, a branch of conditional statements may be replaced with a call to a function or method. For example, assume the text encoding of the machine learning model includes the following conditional statement:

```
IF A == TRUE
    THEN [first of nested conditional statements]
    ELSE [second branch of nested conditional statements]
ENDIF
```

In this example, the first and second branches of nested conditional statements have been replaced with placeholder text for simplicity and readability. The C# code for this example may be generated as:

```
"if (A)
{
    branch1( );
}
else
{
    branch2( );
}"
```

Here, instead of including code for the branches of nested conditional statements, the generated code includes calls to functions that evaluate the branches of the nested conditional statements. Assume that the example conditional statement above was itself a nested conditional statement that is the six hundredth nested conditional statement in a given branch. Assume that each of the first and second branches of the nested conditional statements also include nested conditional statements a further six hundred statements deep. Further assuming a maximum nested conditional statement depth of one thousand, code that does not combine or replace nested conditional statements would exceed the maximum limit. By replacing branches with function calls, no nested conditional statement branch would exceed the maximum depth. One skilled in the art would appreciate that identifying the particular branches of a conditional statement to replace may be performed in a variety of ways. For example, branches may be replaced based on the depth of the branch meeting or exceeding a threshold. The threshold may be a predefined value, such as a maximum depth of nested conditional statements supported by a language or compiler. The threshold may also be a defined parameter or attribute. As an example, branches of nested conditional statements of a depth of N or greater are replaced with a function call. Within that function call, branches of nested conditional statements of a depth of N (or another threshold value) or greater may also be replaced with a function call. Thus, it is ensured that no branch of conditional statements exceed imposed limits or defined threshold values.

In some embodiments, generating, based on the text encoding of the machine learning model, compilable code encoding the machine learning model includes truncating one or more numerical values included in the text encoding of the trained model. The text encoding may use high-precision numerical values (e.g., numerical values with many digits after a decimal place) for confidence scores, values compared when evaluating conditional statements, or other values. Performing mathematical operations using high-precision values may place a computational burden on older computing systems that results in a substantial performance decrease when using the model. Accordingly, the numerical values may be truncated to a predefined number of decimal places. In some embodiments, truncating the numerical values may include eliminating numbers after beyond a particular decimal place. In some embodiments, truncating the numerical values includes rounding the numerical value up or down.

In some embodiments, truncating the numerical values includes including, in the compilable code, for each truncated value, a corresponding whole number value (e.g., with no decimal places). For example, assume that the text encoding includes the numerical value "25.39295202" in a conditional statement. In some embodiments, the generated compilable code for the conditional statement would use the value "25" due to the value being truncated by eliminating all numbers after the decimal place. However, this reduces the precision of the calculations performed for the model. Accordingly, in some embodiments, a value may be truncated by scaling the number by some factor of ten (e.g., 100, 1000, etc.) and then disregarding numbers after the decimal place. As an example, "25.39295202" would be truncated to "2539" by multiplying the value by 100 and disregarding the numbers after the decimal place. Other values from the text encoding would also be scaled for inclusion in the compilable code to ensure that the mathematical calculations of the model are accurate and scaled appropriately.

After generating the compilable code, the translation model generates, based on the compilable code, executable code encoding the training model. Generating the executable code includes compiling the compilable code into the executable code using a compiler. The compilable code may be compiled to a designated target platform. The target platform may include a particular operating system, a particular hardware configuration, or combinations thereof. In addition to the performance enhancements described above provided by compiling code for the model to a target platform, the executable code also receives performance enhancements due to any compiler optimizations applied to the compilable code. Thus, the executable code encoding the machine learning model is afforded significant performance improvements when compared to using a generated binary encoding of the machine learning model with software or wrappers for the target platform.

The computer 100 of FIG. 1 includes disk drive adapter 116 coupled through expansion bus 118 and bus adapter 108 to processor 102 and other components of the computer 100. Disk drive adapter 116 connects non-volatile data storage to the computer 100 in the form of data storage 112. Disk drive adapters useful in computers configured for translating text encodings of machine learning models to executable code according to certain embodiments include Integrated Drive Electronics ('IDE') adapters, Small Computer System Interface ('SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 100 of FIG. 1 includes one or more input/output ('I/O') adapters 120. I/O adapters implement user-oriented input/output through, for example, software drivers and computer hardware for controlling output to display devices such as computer display screens, as well as user input from user input devices 122 such as keyboards and mice. The example computer 100 of FIG. 1 includes a video adapter 124, which is an example of an I/O adapter specially designed for graphic output to a display device 126 such as a display screen or computer monitor. Video adapter 124 is connected to processor 102 through a high speed video bus 128, bus adapter 108, and the front side bus 130, which is also a high speed bus.

The exemplary computer 100 of FIG. 1 includes a communications adapter 132 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for translating text encodings of machine learning models to executable code according to certain embodiments include modems for wired dial-up communications, Ethernet (IEEE 802.3) adapters for wired data communications, and 802.11 adapters for wireless data communications.

FIG. 2A shows a portion of a text encoding of a machine learning model. Particularly, FIG. 2A shows a portion of a text encoding of a machine learning model generated by XGBoost. The text encoding from which FIG. 2A samples is an 88 Megabyte text file. FIG. 2B shows a portion of compilable C# code generated by parsing the text encoding of FIG. 2A. The resulting C# code generated from the text encoding sampled by FIG. 2A is 26 MB, showing improved data size efficiency. FIG. 2C shows code used to compile C# code generated from the text encoding of the machine learning model into an executable library. The resulting executable library is 14 megabytes of compiled, optimized code.

Figure 3:
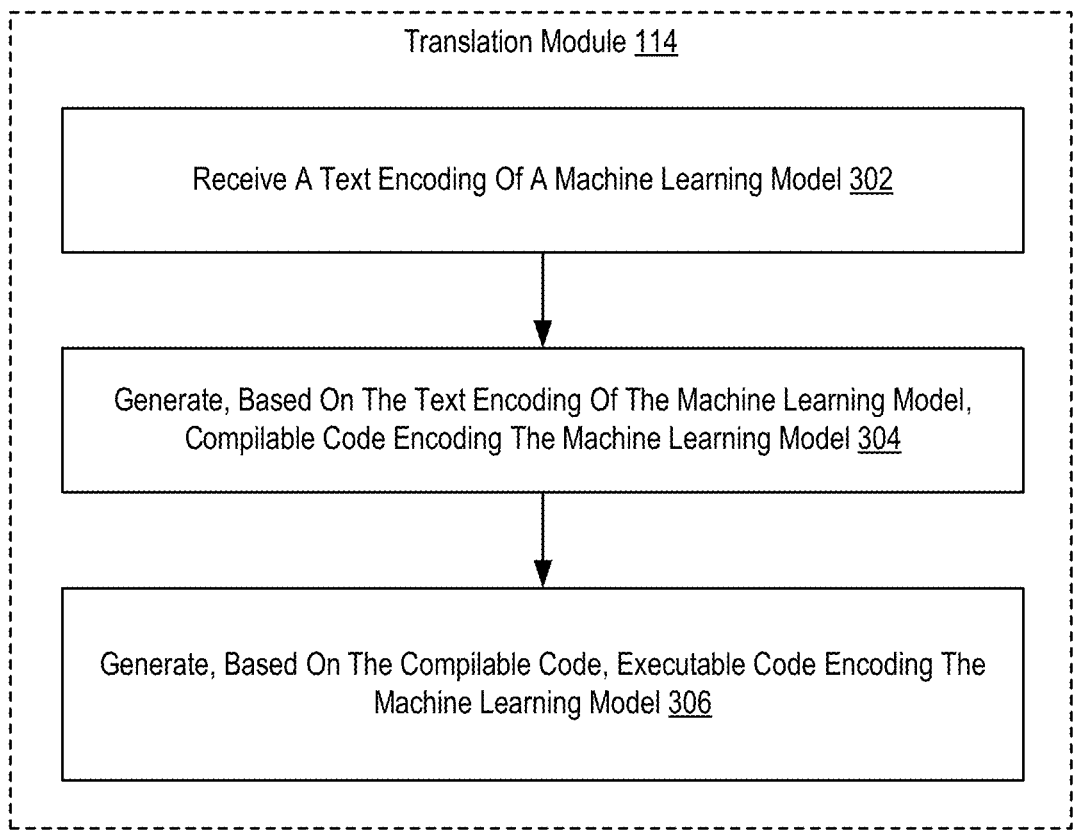
FIG. 3 is a flowchart of an example method for translating text encodings of machine learning models to executable code according to some embodiments.

For further explanation, FIG. 3 sets forth a flow chart illustrating an exemplary method for translating text encodings of machine learning models to executable code that includes receiving 302 (e.g., by a translation module 114) a text encoding of a machine learning model. The text encoding of the machine learning model may be generated by XGBoost or other software used to train and generate machine learning models. For example, the text encoding of the machine learning model encodes a machine learning model trained using training data. It is understood that, in some embodiments, the text encoding of the machine learning model may encode an untrained machine learning model (e.g., a model that has not been provided training data, a model in an initial state, or a manually configured model). The text encoding of the machine learning model include a plurality of conditional statements (e.g., IF statements, CASE SWITCH statements, etc.). One or more of the conditional statements may include nested conditional statements evaluated in response to the evaluation of another conditional statement.

Receiving the text encoding of the machine learning model may include receiving the text encoding as input to the translation module 114. Receiving the text encoding of the machine learning model may also include accessing locally or remotely stored data for the text encoding of the machine learning model.

The method of FIG. 3 also includes generating 304 (e.g., by the translation module 114), based on the text encoding of the machine learning model, compilable code encoding the machine learning model. In some embodiments, generating 304 the compilable code includes parsing the text encoding of the machine learning model using regular expressions or other parsing techniques as can be appreciated. Conditional statements, mathematical calculations, or other operations used in the machine learning functions of the model that are included in the text encoding of the machine learning model may be parsed to facilitate generating corresponding portions of compilable code. For example, operations included in the text encoding of the machine learning model are encoded or stored in a non-code format (e.g., pseudocode, a markup language, etc.). The translation module 114 may identify these operations (e.g., by parsing) and generate equivalent or functionally equivalent portions of compilable code (e.g., as methods, functions, objects, classes, or portions thereof). The generated portions of the compilable code may be output or stored into a file or other data object.

The method of FIG. 3 also includes generating 306 (e.g., by the translation module 114), based on the compilable code, executable code encoding the training model. Generating 306 the executable code includes compiling the compilable code into the executable code using a compiler. The compilable code may be compiled to a designated target platform. The target platform may include a particular operating system, a particular hardware configuration, or combinations thereof. In addition to the performance enhancements described above provided by compiling code for the model to a target platform, the executable code also receives performance enhancements due to any compiler optimizations applied to the compilable code. Thus, the executable code encoding the machine learning model is afforded significant performance improvements when compared to using a generated binary encoding of the machine learning model with software or wrappers for the target platform.

Figure 4:
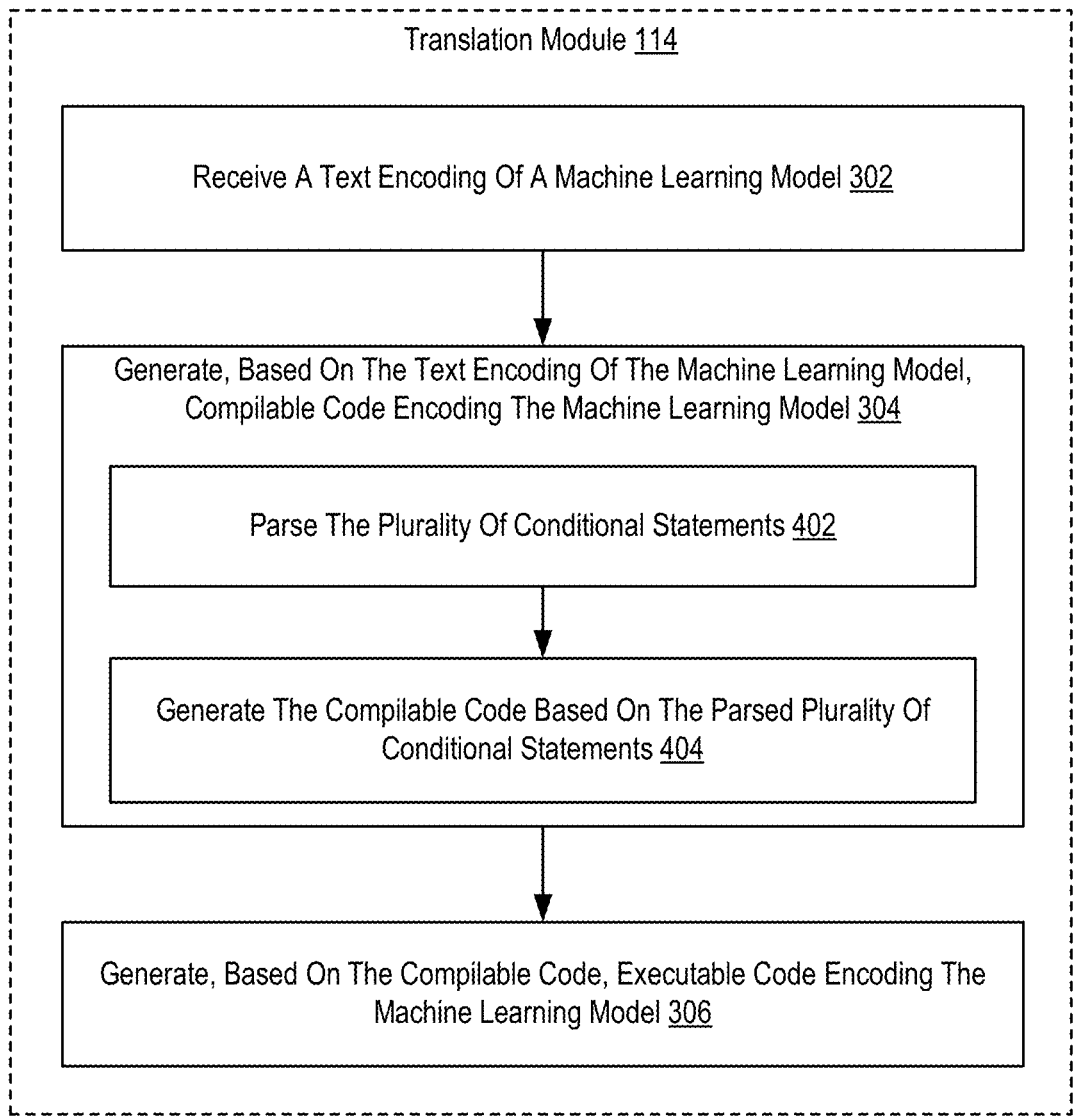
FIG. 4 is a flowchart of an example method for translating text encodings of machine learning models to executable code according to some embodiments.

For further explanation, FIG. 4 sets forth a flow chart illustrating an exemplary method for translating text encodings of machine learning models to executable code that includes receiving 302 (e.g., by a translation module 114) a text encoding of a machine learning model; generating 304 (e.g., by the translation module 114), based on the text encoding of the machine learning model, compilable code encoding the machine learning model; and generating 306 (e.g., by the translation module 114), based on the compilable code, executable code encoding the training model.

FIG. 4 differs from FIG. 3 in that the text encoding of the machine learning model includes a plurality of conditional statements and generating 304, based on the text encoding of the machine learning model, compilable code encoding the machine learning model includes parsing 402 the plurality of conditional statements. Parsing 402 a conditional statement may include identifying an occurrence of a conditional statement in the text encoding of the machine learning model and identifying parameters or attributes of the conditional statement. For example, identifying the parameters or attributes of the conditional statement may include identifying one or more clauses to be evaluated when evaluating the conditional statement, identifying conditional actions performed depending on how the clause(s) are evaluated (e.g., TRUE or FALSE), and the like.

Generating 304, based on the text encoding of the machine learning model, compilable code encoding the machine learning model also includes generating 404 the compilable code based on the parsed plurality of conditional statements. For example, in some embodiment, a conditional statement in the text encoding of the machine learning model may be converted to a conditional statement embodied as one or more lines of compilable code. In some embodiments, the one or more lines of compilable code are generated as a string.

For example, assume the text encoding of the machine learning model includes the following conditional statement:

```
IF input > X
    THEN confidence_score = confidence_score +1
    ELSE confidence_score = confidence_score - 1
ENDIF
```

In this example, a variable "input" is compared to a value X. If "input" is greater than X, a value "confidence score" is increased by 1. Otherwise, the value for "confidence score" is decreased by 1. The translation module 114 may then generate the following string of C# code corresponding to the parsed conditional statement:

```
"if (input > X)
{
    confidence_score++;
}
else
{
    confidence_score--;
}"
```

In this example, a portion of C# code is generated for the conditional statement as a string. The string may then be appended onto another string storing the compilable code that has been generated. For example, a base string is generated by the translation module 114. The base string may be an empty string, or an initialized string including a predefined value (e.g., text found at the beginning of a file of a compilable code defining classes, referencing libraries, beginning a method or function, etc.). Strings of compilable code are then appended to the base string as they are generated. After the text encoding of the machine learning model has been parsed and the string encoding of the compilable code has been generated, the string encoding may then be output to a file that may be compiled. In other embodiments, the compilable code for each parsed conditional statement may be stored in separate data structures or in separate entries in a data structure. For example the compilable code for each parsed conditional statement may each be stored as separate Dictionaries, Vectors, Lists, and the like, or as separate entries in a Dictionary, Vector, List, and the like. To generate the compilable code, the data structure(s) are iterated through and their stored strings of compilable code are output to a file that may be compiled. In a further embodiment, various parameters of the conditional statement (e.g., the clause, the conditional actions) are each encoded as strings or otherwise stored in a data structure, and then included in a lines of compilable code when outputting the compilable file. One skilled in the art would appreciate that a variety of approaches may be used to generate portions of compilable code from parsed conditional statements of the text encoding of the machine learning model, and that approaches other than those described herein may be used.

Figure 5:
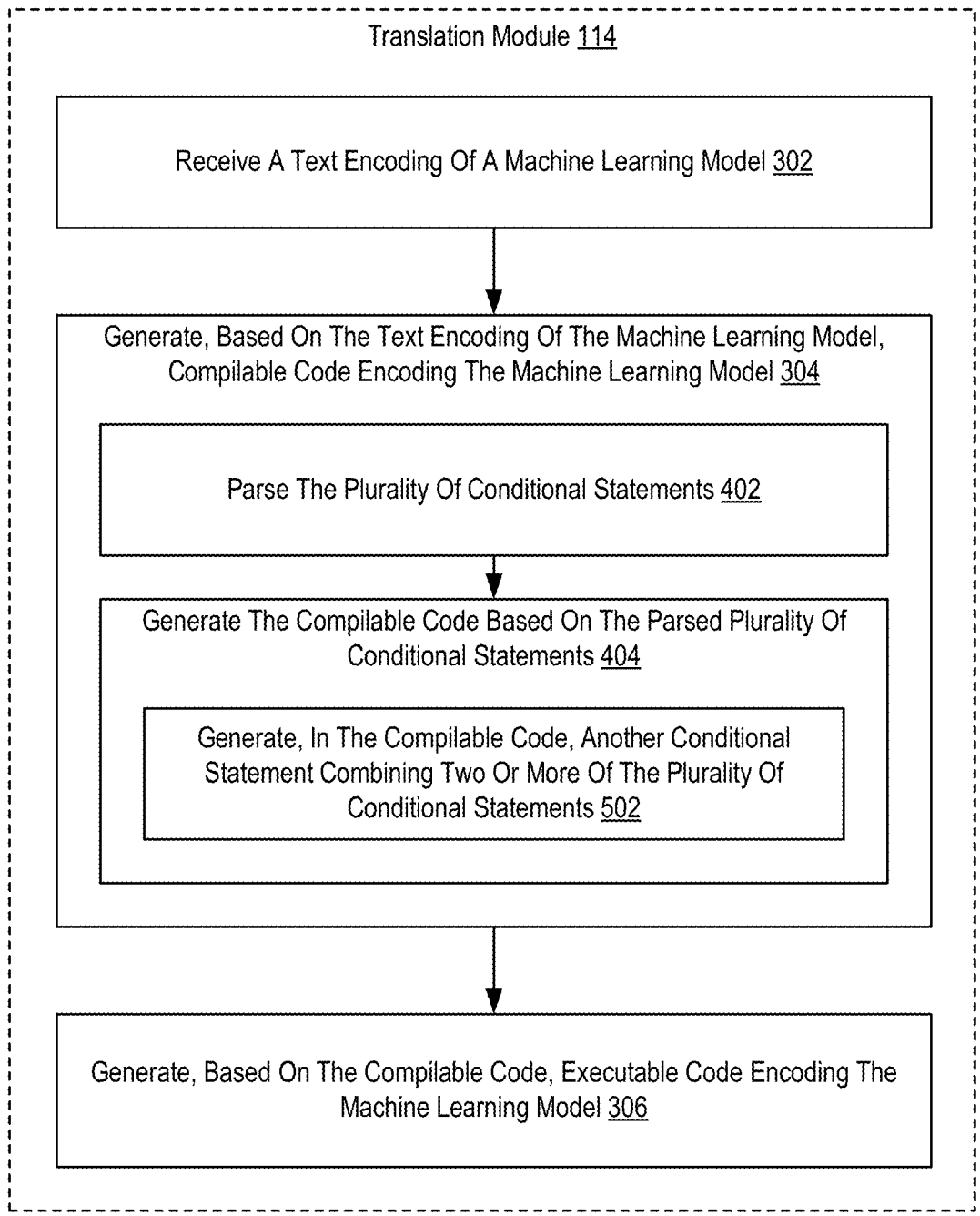
FIG. 5 is a flowchart of an example method for translating text encodings of machine learning models to executable code according to some embodiments.

For further explanation, FIG. 5 sets forth a flow chart illustrating an exemplary method for translating text encodings of machine learning models to executable code that includes receiving 302 (e.g., by a translation module 114) a text encoding of a machine learning model; generating 304 (e.g., by the translation module 114), based on the text encoding of the machine learning model, compilable code encoding the machine learning model, including parsing 402 the plurality of conditional statements; and generating 404 the compilable code based on the parsed plurality of conditional statements; and generating 306 (e.g., by the translation module 114), based on the compilable code, executable code encoding the training model.

FIG. 5 differs from FIG. 4 in that generating 404 the compilable code based on the parsed plurality of conditional statements includes generating 502, in the compilable code, another conditional statement combining two or more of the plurality of conditional statements. For example, some programming languages or compilers may have a limit as to how deeply nested a conditional statement may be (e.g., how many conditional statements are evaluated to evaluate the nested conditional statement). The text encoding of the machine learning model may include nested conditional statements at a greater depth than the limit of the compiler or programming language. Accordingly, a nested conditional statement may be combined with another conditional statement into a single conditional statement.

For example, assume the text encoding of the machine learning model includes the following conditional statement:

```
IF A == TRUE
    THEN IF B == TRUE
        THEN confidence_score = confidence_score + 1
        ELSE
    ELSE
ENDIF
```

Here, the "IF B==TRUE" conditional statement is nested within the "IF A==TRUE" conditional statement, only being evaluated if A is TRUE. The corresponding C# code for this conditional statement may be generated as:

```
"if (A)
{
   if (B)
   {
      confidence_score++;
   }
}"
```

Functionally equivalent C# code combining conditional statements may instead be generated as:

```
"if (A && B)
{
   confidence_score++;
}"
```

Thus, the nested conditional statement "IF B==TRUE" is combined with the conditional statement "IF A==TRUE" to reduce the depth of the nested conditional statement. One skilled in the art would appreciate that this is merely an example, and that more deeply nested conditional statements may also be combined. Moreover, one skilled in the art would appreciate that how various nested conditional statements are combined would depend on the particular chain of conditional statements to be combined.

Figure 6:
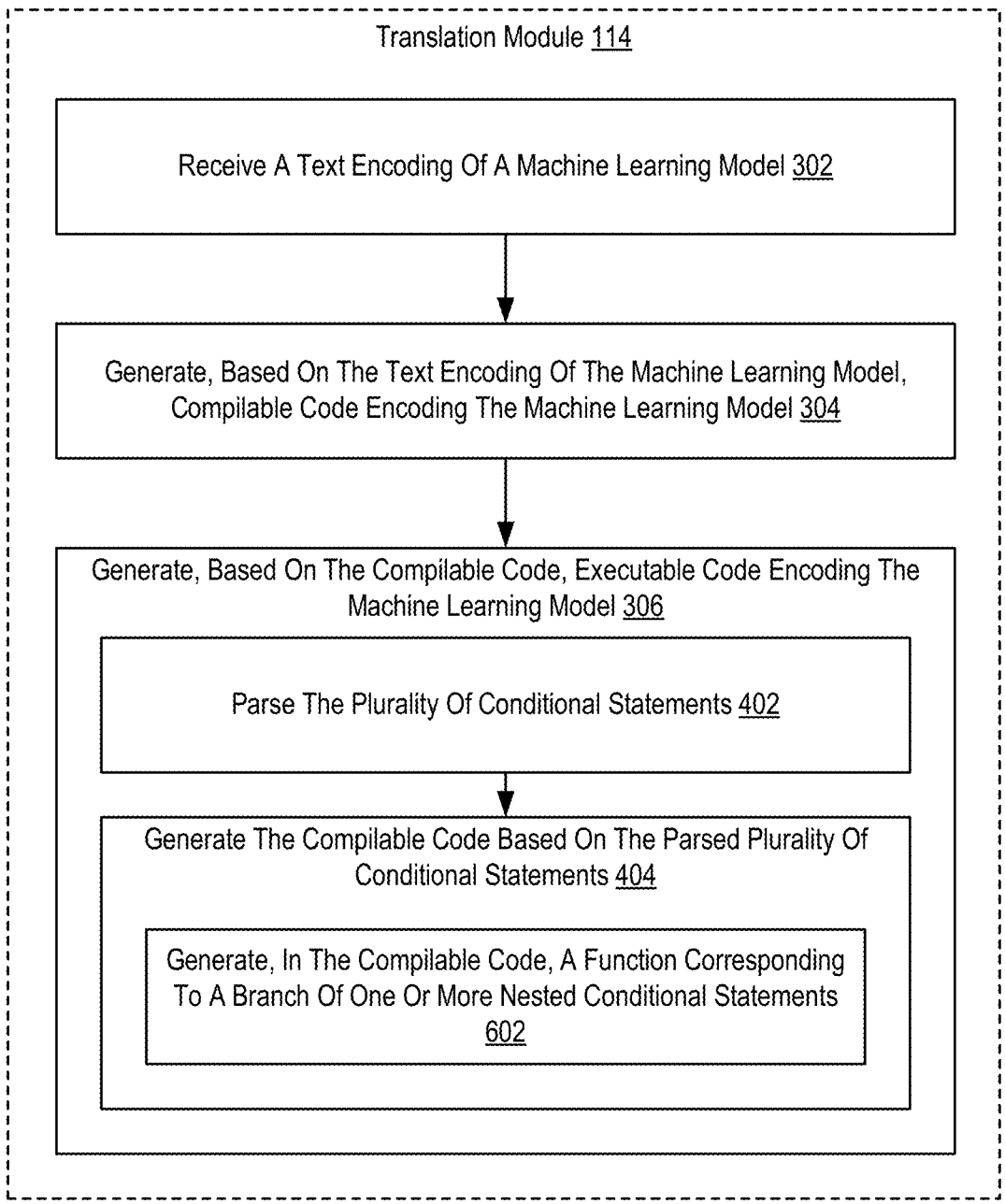
FIG. 6 is a flowchart of an example method for translating text encodings of machine learning models to executable code according to some embodiments.

For further explanation, FIG. 6 sets forth a flow chart illustrating an exemplary method for translating text encodings of machine learning models to executable code that includes receiving 302 (e.g., by a translation module 114) a text encoding of a machine learning model; generating 304 (e.g., by the translation module 114), based on the text encoding of the machine learning model, compilable code encoding the machine learning model, including parsing 402 the plurality of conditional statements; and generating 404 the compilable code based on the parsed plurality of conditional statements; and generating 306 (e.g., by the translation module 114), based on the compilable code, executable code encoding the training model.

FIG. 6 differs from FIG. 4 in that generating 404 the compilable code based on the parsed plurality of conditional statements includes generating 602, in the compilable code, a function corresponding to a branch of one or more nested conditional statements. In some embodiments, to reduce the depth of nested conditional statements in the compilable code, a branch of conditional statements may be replaced with a call to a function or method. For example, assume the text encoding of the machine learning model includes the following conditional statement:

```
IF A == TRUE
   THEN [first of nested conditional statements]
   ELSE [second branch of nested conditional statements]
ENDIF
```

In this example, the first and second branches of nested conditional statements have been replaced with placeholder text for simplicity and readability. The C# code for this example may be generated as:

```
"if (A)
{
   branch1( );
}
else
{
   branch2( );
}"
```

Here, instead of including code for the branches of nested conditional statements, the generated code includes calls to functions that evaluate the branches of the nested conditional statements. Assume that the example conditional statement above was itself a nested conditional statement that is the six hundredth nested conditional statement in a given branch. Assume that each of the first and second branches of the nested conditional statements also include nested conditional statements a further six hundred statements deep. Further assuming a maximum nested conditional statement depth of one thousand, code that does not combine or replace nested conditional statements would exceed the maximum limit. By replacing branches with function calls, no nested conditional statement branch would exceed the maximum depth. One skilled in the art would appreciate that identifying the particular branches of a conditional statement to replace may be performed in a variety of ways. For example, branches may be replaced based on the depth of the branch meeting or exceeding a threshold. The threshold may be a predefined value, such as a maximum depth of nested conditional statements supported by a language or compiler. The threshold may also be a defined parameter or attribute. As an example, branches of nested conditional statements of a depth of N or greater are replaced with a function call. Within that function call, branches of nested conditional statements of a depth of N (or another threshold value) or greater may also be replaced with a function call. Thus, it is ensured that no branch of conditional statements exceed imposed limits or defined threshold values.

Figure 7:
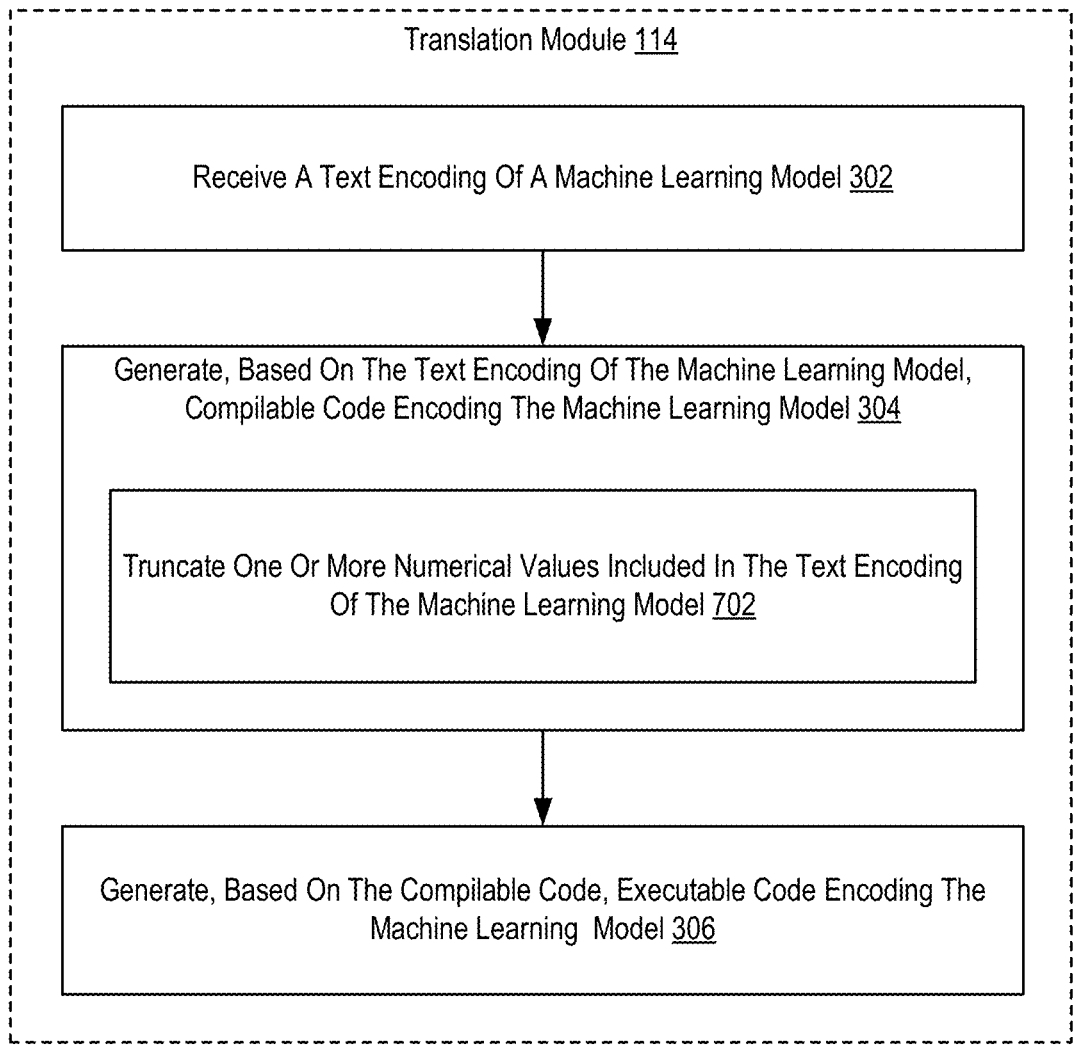
FIG. 7 is a flow chart of an example method for translating text encodings of machine learning models to executable code according to some embodiments.

For further explanation, FIG. 7 sets forth a flow chart illustrating an exemplary method for translating text encodings of machine learning models to executable code that includes receiving 302 (e.g., by a translation module 114) a text encoding of a machine learning model; generating 304 (e.g., by the translation module 114), based on the text encoding of the machine learning model, compilable code encoding the machine learning model; and generating 306 (e.g., by the translation module 114), based on the compilable code, executable code encoding the training model.

FIG. 7 differs from FIG. 3 in that generating 304, based on the text encoding of the machine learning model, compilable code encoding the machine learning model includes truncating 702 one or more numerical values in the text encoding of the machine learning model. The text encoding may use high-precision numerical values (e.g., numerical values with many digits after a decimal place) for confidence scores, values compared when evaluating conditional statements, or other values. Performing mathematical operations using high-precision values may place a computational burden on older computing systems that results in a substantial performance decrease when using the model. Accordingly, the numerical values may be truncated to a predefined number of decimal places. In some embodiments, truncating the numerical values may include eliminating numbers after beyond a particular decimal place. In some embodiments, truncating the numerical values includes rounding the numerical value up or down.

In some embodiments, truncating the numerical values includes including, in the compliable code, for each truncated value, a corresponding whole number value (e.g., with no decimal places). For example, assume that the text encoding includes the numerical value "25.39295202" in a conditional statement. In some embodiments, the generated compilable code for the conditional statement would use the value "25" due to the value being truncated by eliminating all numbers after the decimal place. However, this reduces the precision of the calculations performed for the model. Accordingly, in some embodiments, a value may be truncated by scaling the number by some factor of ten (e.g., 100, 1000, etc.) and then disregarding numbers after the decimal place. As an example, "25.39295202" would be truncated to "2539" by multiplying the value by 100 and disregarding the numbers after the decimal place. Other values from the text encoding would also be scaled for inclusion in the compilable code to ensure that the mathematical calculations of the model are accurate and scaled appropriately.

In view of the explanations set forth above, readers will recognize that the benefits of translating text encodings of machine learning models to executable code include:

- Improved performance of a computing system by generating executable code for machine learning models targeted to particular platforms, providing a performance increase compared to using platform-independent binary encodings of the machine learning model with software or wrappers.
- Improved performance of a computing system by allowing of a text encoding of a machine learning model to generate executable code for the machine learning model targeted to any of multiple platforms.

Exemplary embodiments of the present disclosure are described largely in the context of a fully functional computer system for translating text encodings of machine learning models to executable code. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of translating text encodings of machine learning models to executable code, the method comprising:
   receiving a text encoding of a machine learning model;
   generating, based on the text encoding of the machine learning model, a compilable code encoding of the machine learning model, wherein the text encoding of the machine learning model includes a plurality of conditional statements, wherein generating the compilable code encoding of the machine learning model comprises:
   parsing the plurality of conditional statements; and
   generating the compilable code encoding of the machine learning model based on the parsed plurality of conditional statements.

2. The method of claim 1, wherein each of the plurality of conditional statements comprise one or more conditional actions, wherein the one or more conditional actions comprise a nested conditional statement or a modification to a confidence score.

3. The method of claim 1, wherein generating the compilable code encoding of the machine learning model based on the parsed plurality of conditional statements comprises generating, in the compilable code encoding of the machine learning model, another conditional statement combining two or more of the plurality of conditional statements.

4. The method of claim 1, wherein generating the compilable code encoding of the machine learning model based on the plurality of parsed conditional statements comprises generating, in the compilable code encoding of the machine learning model, a function corresponding to a branch of one or more nested conditional statements.

5. The method of claim 1, wherein generating the compilable code encoding of the machine learning model comprises truncating one or more numerical values included in the text encoding of the machine learning model.

6. The method of claim 1, further comprising generating an executable code encoding of the machine learning model, wherein generating the executable code encoding of the machine learning model comprises compiling the compilable code to a target platform.

7. The method of claim 1, wherein the machine learning model comprises a classifier.

8. An apparatus for translating text encodings of machine learning models to executable code, the apparatus comprising at least one processor and memory storing instructions that, when executed, cause the at least one processor to perform steps comprising:
   receiving a text encoding of a machine learning model;
   generating, based on the text encoding of the machine learning model, a compilable code encoding of the machine learning model, wherein the text encoding of the machine learning model includes a plurality of conditional statements, wherein generating the compilable code encoding of the machine learning model comprises:
   parsing the plurality of conditional statements; and
   generating the compilable code encoding of the machine learning model based on the parsed plurality of conditional statements.

9. The apparatus of claim 8, wherein each of the plurality of conditional statements comprise one or more conditional actions, wherein the one or more conditional actions comprise a nested conditional statement or a modification to a confidence score.

10. The apparatus of claim 8, wherein generating the compilable code encoding of the machine learning model based on the parsed plurality of conditional statements comprises generating, in the compilable code encoding of the machine learning model, another conditional statement combining two or more of the plurality of conditional statements.

11. The apparatus of claim 8, wherein generating the compilable code encoding of the machine learning model based on the plurality of parsed conditional statements comprises generating, in the compilable code encoding of the machine learning model, a function corresponding to a branch of one or more nested conditional statements.

12. The apparatus of claim 8, wherein generating the compilable code encoding of the machine learning model comprises truncating one or more numerical values included in the text encoding of the machine learning model.

13. The apparatus of claim 8, further comprising generating, based on the compilable code encoding of the machine learning model, an executable code encoding of the machine learning model, wherein generating the executable code encoding of the machine learning model comprises compiling the compilable code to a target platform.

14. The apparatus of claim 8, wherein the machine learning model comprises a classifier.

15. A non-transitory computer readable medium storing computer program instructions for translating text encodings of machine learning models to executable code that, when executed, cause a computer system to perform steps comprising:

receiving a text encoding of a machine learning model;

generating, based on the text encoding of the machine learning model, a compilable code encoding of the machine learning model, wherein the text encoding of the machine learning model includes a plurality of conditional statements, wherein generating the compilable code encoding of the machine learning model comprises:

parsing the plurality of conditional statements; and generating the compilable code encoding of the machine learning model based on the parsed plurality of conditional statements.

16. The non-transitory computer readable medium of claim 15, wherein each of the plurality of conditional statements comprise one or more conditional actions, wherein the one or more conditional actions comprise a nested conditional statement or a modification to a confidence score.

17. The non-transitory computer readable medium of claim 15, wherein generating the compilable code encoding of the machine learning model based on the parsed plurality of conditional statements comprises generating, in the compilable code encoding of the machine learning model, another conditional statement combining two or more of the plurality of conditional statements.

18. The non-transitory computer readable medium of claim 15, wherein generating the compilable code encoding of the machine learning model comprises truncating one or more numerical values included in the text encoding of the machine learning model.

19. The non-transitory computer readable medium of claim 15, further comprising generating an executable code encoding of the machine learning model, wherein generating the executable code encoding of the machine learning model comprises compiling the compilable code to a target platform.

20. The non-transitory computer readable medium of claim 15, wherein the machine learning model comprises a classifier.

\* \* \* \* \*